United States Patent
Wilkens et al.

(10) Patent No.: US 6,530,311 B1
(45) Date of Patent: Mar. 11, 2003

(54) METHOD OF AND A BALE PRESS FOR PRODUCING HIGH-DENSITY ROUND BALES FROM AGRICULTURAL HARVEST PRODUCTS

(75) Inventors: Dieter Wilkens, Wolfenbüttel-Ahlum (DE); Joost Honhold, Wolfenbüttel (DE)

(73) Assignee: Lely Maschinenfabrik GmbH, Wolfenbüttel (DE)

( * ) Notice: Subject to any disclaimer, the term of this patent is extended or adjusted under 35 U.S.C. 154(b) by 0 days.

(21) Appl. No.: 09/458,867

(22) Filed: Dec. 10, 1999

(30) Foreign Application Priority Data

Dec. 10, 1998 (DE) .......................................... 198 56 977

(51) Int. Cl.[7] .............................................. B30B 13/00
(52) U.S. Cl. .............................. 100/40; 100/44; 100/45; 100/49; 100/50; 100/87
(58) Field of Search ................................ 100/5, 35, 40, 100/43, 44, 45, 49, 50, 346, 353, 87, 88; 56/341

(56) References Cited

U.S. PATENT DOCUMENTS

| 4,257,219 A | * | 3/1981 | Burrough et al. ............. 100/88 |
| 4,611,535 A | * | 9/1986 | Ansttey et al. ............... 100/43 |
| 4,750,323 A | * | 6/1988 | Sheehan et al. ............... 56/341 |
| 4,850,271 A | * | 7/1989 | White et al. .................. 100/88 |
| 5,025,717 A | * | 6/1991 | Viaud et al. .................. 100/88 |
| 5,138,942 A | * | 8/1992 | Henderson et al. ........... 100/88 |
| 5,165,332 A | * | 11/1992 | Lee ............................. 100/88 |
| 5,367,865 A | * | 11/1994 | Jennings et al. .............. 56/341 |
| 5,551,218 A | * | 9/1996 | Henderson et al. ........... 100/88 |
| 5,622,104 A | * | 4/1997 | Viesselmann et al. ........ 100/88 |
| 5,913,805 A | * | 6/1999 | Vodon ........................ 56/341 |
| 6,079,324 A | * | 6/2000 | Feraboli et al. .............. 100/40 |

FOREIGN PATENT DOCUMENTS

EP 0150629 8/1985

* cited by examiner

*Primary Examiner*—John Sipos
*Assistant Examiner*—Louis Huynh
(74) *Attorney, Agent, or Firm*—Sidley Austin Brown & Wood, LLP

(57) ABSTRACT

A method of producing high-density bales from harvest products in a bale press with a variable volume compression chamber which is circumferentially limited by belts, a chain conveyor rolls and which yields to a force imparted by preloaded means, with the method including controlling a pressing power applied to a harvest product by the belts, the chain conveyor and the rolls dependent on a driving torque of the bale press, and automatically increasing the pressing power during formation of a bale upon an interruption of product delivery or a relative reduction in the product delivery into the compression chamber of the bale press; and a bale press for effecting the method.

5 Claims, 2 Drawing Sheets

Figure 1:
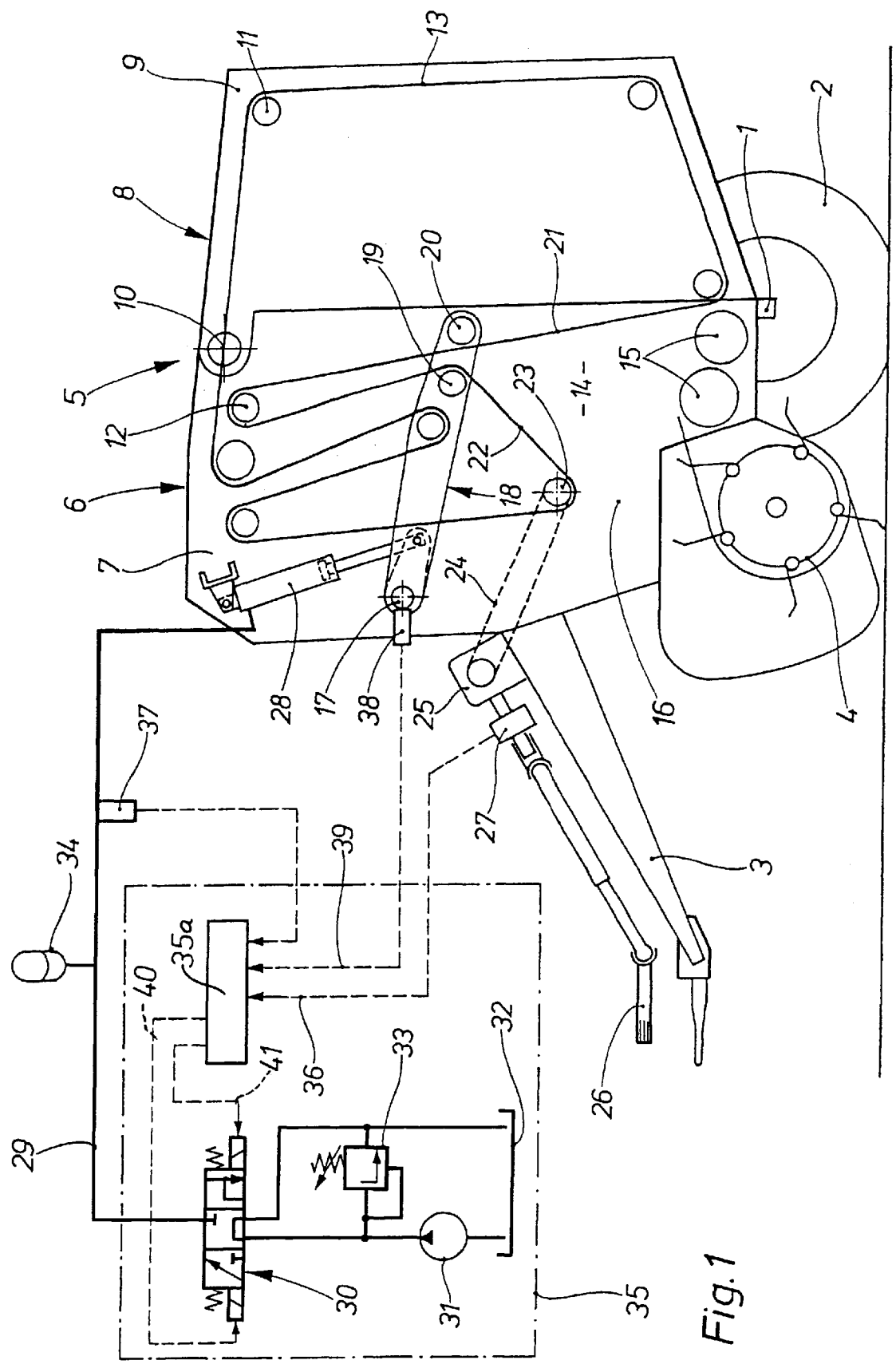

METHOD OF AND A BALE PRESS FOR PRODUCING HIGH-DENSITY ROUND BALES FROM AGRICULTURAL HARVEST PRODUCTS

BACKGROUND OF THE INVENTION

1. Field of Invention

The present invention relates to a method of producing high-density round bales from agricultural harvest products such as wilted grass, hay, straw in a bale press with a variable volume compression chamber which is circumferentially limited by belts, a chain conveyor, rolls and which yields to a force imparted by preloaded means, with the method including controlling of a pressing power applied to a harvest product by the belts, the chain conveyor and the rolls dependent on a driving torque of the bale press.

The present invention also relates to a bale press for producing high-density round bales from agricultural harvest products such as wilted grass, hay, or straw, in particular for effecting the above-described method, and including an element for sensing a driving torque generated by the bale press drive and connected with a control device that provides for reduction of the pressure power used to form a bale in response to the driving torque exceeding a predetermined threshold.

2. Description of the Prior Art

An important criterium in producing round bales is a possibility to obtain high compressed densities. Only round bales having very high compressed densities permit to produce economically justifiable volumes suitable for both transportation and storage. High-densities bales are also characterized by an increased form stability in comparison with bales having a not so high compressed density. Further, high compressed densities provide for a good ensilaging. A compressed density, as known, depends on a type of the harvested product, its humidity, delivery speed, etc . . . However, primarily, the compressed density depends on the entire press system, an applied pressing power, and an available driving power.

A bale press of the type described above is disclosed, e.g., in European Publication EP-0 150 629. The belt tensioning means are arranged in a closed hydraulic system formed of hydraulic cylinders, an adjustable relief valve, and a four-way valve. Before the start of the pressing process, the hydraulic system is charged with a desired pressure and then is closed. When with an increased bale diameter, the pressure set up at the relief valve is exceeded, the valve opens, and the piston moves out of the cylinder with ever increasing bale diameter. If the set-up pressure is very high, then the overload protection means in the drive line becomes actuated, resulting in a stoppage of the bale-forming process, with the bale being ejected from the compression chamber in an unbound condition. This is a serious drawback. In order to prevent actuation of the overload protection clutch, EP-0 150 629 suggests to arrange a torque measuring element on the main shaft which provides for reduction, i.e., adjustment of the set-up pressure of the relief valve only when the torque exceeds a predetermined torque, with the reduced pressure being maintained until the torque reaches an allowable magnitude. Upon the torque reaching the allowable magnitude, the relief valve automatically closes. A drawback of this suggestion consists in that compressed bale, upon reduction of the pressing power, expands, with a resulting reduction of the compressed density of the bale.

French Patent No. 2,615,351 disclose a bale press likewise equipped with a hydraulic belt tensioning device which includes a curved tract cooperating with a lever arm of the hydraulic cylinder for adjusting the pressing power dependent on the bale diameter. The drawback of this solution consists in that with a corresponding increase in the throughput, the pressure also increases which can lead to an overload with accompanying fluctuations of the driving torque.

U.S. Pat. No. 4,257,219 discloses a control device which provides for the application of a reduced pressure at the start of bale formation, and for application of an increased pressure at a later stage of the bale formation. The switching is effected mechanically dependent on the bale diameter.

German Publication No. 197 1 8229 discloses regulation of the pressing power between upper and lower thresholds, with an adjustable relief valve forming part of a closed hydraulic system.

A common drawback of all of the prior art bale presses consists in that the power requirement and the pressing power decrease when, e.g., the delivery of the harvest product is interrupted or reduced because of a thinner swath. The reduction of the pressing power results in the reduction of the compressed density and in incomplete utilization of tractor and/or bale press driving torque.

Accordingly, an object of the present invention is to provide a method of and a bale press for forming round bales which would permit a high degree of utilization of the power of both the tractor and the bale press.

SUMMARY OF THE INVENTION

This and other objects of the present invention, which will become apparent hereinafter, are achieved by providing a method of forming round bales and a bale press therefore with which the pressing power in the compression chamber of the bale press automatically increases upon interruption of the product delivery or its reduction during formation of a bale. To this end, the bale press is provided with means for automatically increasing the pressing power above a predetermined pressing power.

The inventive method and bale press permit to use the underutilized power potential in a simple manner for increasing the compressed density of the bales, simultaneously providing for a uniform load on the tractor drive which favorable influences the energy consumption.

According to the present invention, preferably, the pressing power is increased when the driving torque falls below a predetermined or present lower.

Dependent on the type of the material, compressed density, and the diameter of the bale, which is being formed, the increase in pressing power results in a larger or smaller reduction of the diameter of the compression chamber and, thereby, of the bale, which leads to an increased compressed density of the bale. In addition, upon the bale reaching the desired diameter, the increase of the pressing power provides for a firmer outer layer which favorably influences the weather resistance of the bale and makes it less sensitive to adverse weather conditions.

According to the invent on, the means for increasing the pressing power above the reset pressing power includes a control device with a pressure source or a similar energy source for increasing the pressing power. The pressure force is constantly available for a continuous stepless adjustment of the pressing power and, in particular, for its increase, rather than for a pressure built-up at the beginning of the pressing process, as is common in the prior art bale-forming processes.

Because a smaller pressing power is desired at the start of the bale-forming process, there is provided a sensor for measuring, directly or indirectly (e.g., by measuring the roll rotational speed), the bale diameter, which sensor is operationally connected with the control device.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTIONS OF THE DRAWINGS

Figure 2:
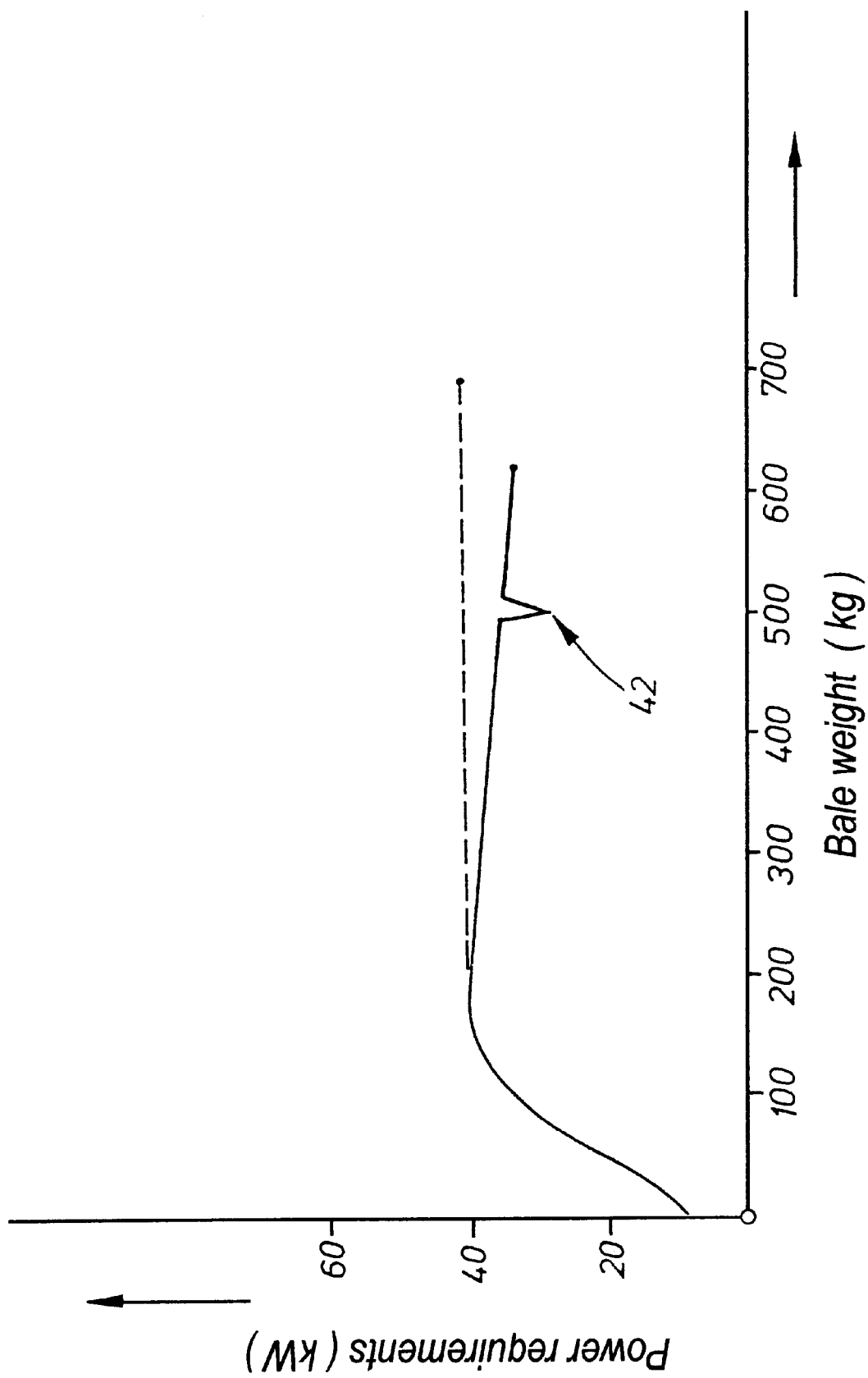

The drawings show:

FIG. 1 a longitudinal schematic view of a bale press according to the present invention with a variable volume compression chamber; and FIG. 2 a diagram illustrating the relationship between a driving torque and a bale weight during a bale-forming process with and without a device according to the present invention.

DETAILED DESCRIPTION OF THE PREFERRED EMBODIMENT

A bale press for producing round bales according to the present invention, which is schematically shown in FIG. 1, includes a chassis generally designated with a reference numeral 1 and having wheels 2. The chassis 1 is connectable with a tractor (not shown) by a tow bar 3. The wheels 2 are provided in front, in the operational direction of the bale press, of a conventional pick-up 4. A compression chamber housing, which is generally designated with a reference numeral 5 is formed of a stationary, fixedly secured to the chassis 1, front housing part 6 with front side walls 7 and a rear housing part 8 with rear side walls 9 which is pivotally connected with the front housing 6 and which swings out about an upper pivot axle 10 upon formation of a bale for ejecting the bale.

A plurality of rolls 11, 12 extend between the side walls 7 and 9. The rolls 11, 12 are secured in the side walls 7 and 9 with a possibility of rotation. A plurality of continuous belts 13 are supported by the rolls 11 and 12 between the side walls 7 and 9. The belts 13 form an expandable compression chamber 14 for forming cylindrical bales. From beneath, the bale compression chamber 14 is limited by two rolls 1 and has an inlet opening 16 from above, the ball compression chamber 14 is closed by opposite, narrowly spaced, rolls 19 and 20. The rolls 19 and 20 are arranged on a belt tensioning device 18 that pivots about an axle 17. The rolls 19 and 20 guide belt sections 22 and 21, respectively. The belts 13 are driven by a shaft 23 which is connected with a main drive 25 by a chain drive 24. The main drive 25 is connectable with a tractor take-off shaft (not shown) by a cardan shaft 26. A torque measuring hub 27 is arranged between the main drive 25 and the cardan shaft 26. The torque measuring hub, which is per se known, can also be arranged in the drive of the shaft 23.

The belt tensioning device 18 is connected, at both its sides, with the front housing part 6 by respective single-acting hydraulic cylinders 28. The cylinder chambers of both hydraulic cylinders 28 are connected with a common pressure conduit 29 with a proportional directional control, electromagnetic three-way valve 30. The three-way directional control valve 30 has an intermediate neutral position which is shown in FIG. 1 in which a hydraulic pump 31 circulates an unpressurized medium from a reservoir 32 through delivery and return conduits. The delivery and return conduits are connected by a relief valve 33. Upon actuation of a left electromagnetic valve, the control spool moves to the right, and the pump 31 delivers the pressure medium into the pressure conduit 29. Upon actuation of a right electromagnetic valve, the pressure medium, oil, flows from the pressure conduit 29 back into the reservoir 32. For damping the pressure control, a preloaded accumulator 34 is connected to the pressure conduit 29. A maximal pressure in the pressure conduit 29 is preset with a relief valve 33. The three-way valve 30 forms part of an electronic control device generally designated with a reference numeral 35.

The control device 35 includes a control unit 35a that has three input variables: a torque 36, which is measured by a torque measuring hub 27 incorporated in the main drive 25, a hydraulic pressure which is measured by a pressure sensor 37 that measures pressure in the pressure conduit 29 and which pressure represents pressure applied by belts 13 to the harvest product, and a bale diameter 39 measured by a sensor 38 arranged on the pivot axle 17 of the belt tensioning device 18. The sensor 38 can be formed, e.g., as a rotary potentiometer. At least set values for the torque or the available power (upper threshold) and a lower threshold corresponding to a pressure increase, as well as set values for the pressure or hydraulic pressure dependent on the type of the harvest product and humidity are set up in the control unit 35a. Actual pressure values are measured with a sensor 37 and are adjusted in accordance with the set values by the control unit 35a during a normal operation of the bale press. Further, a set value of an initial diameter of a bale is pre-set, with the drive torque or the drive power being kept constant after the bale diameter reaches the preset initial diameter. Two control conductors 40, 41 connect the control unit 35a with the three-way valve 30.

The bale press according to the present invention operates as follows.

An operator sets up, in the control unit 35a, available, on the take-off shaft, driving power, e.g., 40 KW and a lower threshold of, e.g., 35 KW, and a set pressure of, e.g., 120 bar for straw. The operator further sets up an initial bale diameter of 0.6 m. At a bale diameter of 0.6 m, a signal for maintaining a constant power control is produced by the control unit 35a. If the amount of the delivered product decreases, e.g., because of a thin swath or some other change, oil is delivered to the hydraulic cylinders 28 by adjusting the operation of the three-way valve 30 which is effected by the control unit 35a. Thereby, a uniform driving power during the formation of a bale is achieved by a corresponding increase of the compression density or the pressure. I.e., when the lower threshold of 35 KW is exceeded, the power reserve of 5 KW is used for increasing the compressed density. At that, the hydraulic pressure, independent on the preset pressure of 120 bar, but torque dependent, is simultaneously adjusted to the highest pressure of 180 bar preset on the relief valve 33, whereby, in an extreme case, a reduction of bale diameter of from 3 to 5%, dependent on the diameter and the density, is obtained. Thereby, the torque is increased for a short time and then again adjusted to a value corresponding to the set pressure value.

FIG. 2 shows, with a solid line, a typical diagram of a bale weight-dependent or a time-dependent power requirement in a bale press with a variable volume compression chamber during formation of a bale. The power requirement during an idle operation of a bale press is about 5 KW. Upon delivery of a harvest product, the power consumption increases approximately linearly, reaches its maximum and then smoothly slightly decreases, dependent on the delivery, with an increase in the bale weight, or falls suddenly (see arrow 42) when no delivery takes place. This change in the power consumption results in an incomplete use of the tractor or bale press power, inadequate bale density, and/or in relatively small bale weights. The dash line shows the same diagram for a bale press according to the present invention under the same product delivery conditions or delivery characteristics. Optimally, the mean power requirement remains almost constant with the bale weight increase. The power of both the tractor and the press is used to capacity, with higher bale weights, approximately by 15%, at the same bale diameters.

Though the present invention was shown and described with references to the preferred embodiment, such are merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of producing high-density bales from harvest products in a bale press with a variable volume compression chamber which is circumferentially limited by belts, a chain conveyor, rolls and which yields to a pressure force imparted by preloaded means, the method comprising the steps of controlling a pressing power applied to a harvest product by the belts, the chain conveyor and the rolls dependent on a driving torque of the bale press; automatically increasing the pressing power during formation of a bale upon a reduction in the amount of the harvest product being delivered into the compression chamber during formation of the bale by increasing the pressure force imparted by the preloaded means; and constantly measuring the driving torque for controlling the increasing of the pressure power such that the pressure force imparted by the preloaded means is increased.

2. A method as set forth in claim 1, further comprising the step of automatically increasing the pressing power upon the driving torque being decreased below a lower predetermined value.

3. A method as set forth in claim 1, wherein the pressing power increasing step includes a reduction of a diameter of the compression chamber and thereby of a diameter of a to-be-formed bale in comparison with a diameter of a bale already formed in the compression chamber.

4. A method as set forth in claim 1, wherein the pressing power is automatically increased maximum up to an adjustable upper threshold of one of the driving torque and the pressure force.

5. A method as set forth in claim 1, wherein the pressing power controlling step comprises controlling the pressing power in dependence on the driving torque of bale press in such a way that the driving torque remains substantially constant, during the formation of a bale, with an increase of a bale weight starting from a bale diameter of 0.6 m.

\* \* \* \* \*